(No Model.)
J. B. HYDE.
SUBMARINE ELECTRIC CONDUCTOR.
No. 290,881. Patented Dec. 25, 1883.
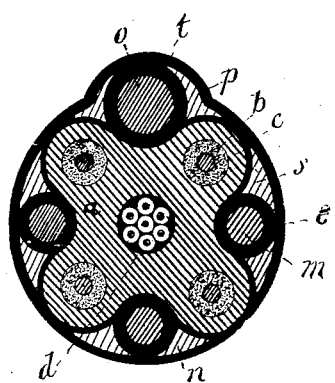
WITNESSES
Geo. N. Hawey
Edward E. Ellis
INVENTOR
J. Burrows Hyde
By O. E. Duffy
Attorney

United States Patent Office.

J. BURROWS HYDE, OF NEW YORK, N. Y.

SUBMARINE ELECTRIC CONDUCTOR.

SPECIFICATION forming part of Letters Patent No. 290,881, dated December 25, 1883.

Application filed November 3, 1883. (No model.)

*To all whom it may concern:*

Be it known that I, J. BURROWS HYDE, a citizen of the United States of America, residing at New York, in the county of New York and State of New York, have invented certain new and useful Improvements in Submarine Electric Conductors, of which the following is a specification, reference being had therein to the accompanying drawing.

My invention relates to that class of electric conductors or cables designed to be laid and used under water; and my improvement consists in employing lead as a carrying and protecting medium for the thread-covered insulated wire conductors; but as the tensile strength of lead is insufficient to sustain the weight of such cable at considerable depths, I re-enforce the lead with steel or iron wires firmly bound thereto, as will be described.

For a foundation I employ as the cable proper a shape of lead cable similar to the one patented by me on the 11th day of September, 1883, No. 284,854, Fig. 9, in which I employ five thread-covered insulated wires. (See drawing, which shows a cross-section of the cable, consisting of a square figure, *a*, of lead, with the corners rounded and sides curved inwardly, as shown.) A thread-covered insulated wire, *b*, is placed in each corner *c*, showing the thread insulated covering. A fifth similar wire may be placed in the center of the four, but preferably a group of telephone or smaller wires instead, as shown in the drawing at *d*.

For the telegraph-wires *b*, I prefer No. 16 copper wire, and for the wires at *d*, I prefer wires not larger than No. 30 gage, each wire being double-wrapped with silk insulated and separately covered with lead, then closely grouped together and drawn into the cable-machine with the single wires, as in my Patent 284,855, September 11, 1883. The compound lead cable thus formed I coat throughout with an adhesive water-proof insulating compound, *s*, and lay into three of the valleys a galvanized iron or steel wire, *e*—say of about No. 10 gage— first covering the wire with tarred thread *m* or any similar wrapping, and into the fourth valley I lay a larger wire—say No. 8 gage— also galvanized and similarly covered, as at *o*, to swell the cable at that point, as shown, for an indicator or counter. Into the longitudinal depressions thus formed along the surface of the cable I lay rope-yarns or other proper spun fiber saturated with water-resisting material, as tar, *n*, and wrap this throughout with tarred thread or twine; and then the cable may be closely wound throughout with wire *p*, as shown, after which the cable should be passed through rollers, two of which take sharply against each side of the indicator *o* to depress the wire surface at those lines and form the ridge *t*, that may be readily detected by the fingers, so that by counting therefrom right or left the individual wires may be found without error.

What I claim is—

1. An electric cable approximating in transverse section to a cross, with corners rounded, the sides thereof being curved inward, in combination with tension wires located on said sides, the whole being wrapped with wire, substantially as described.

2. An electric cable formed as described, and coated with an adhesive compound, having on each side thereof a tension-wire, one of which wires is of greater diameter than the others, the whole being wrapped or covered, substantially as set forth.

3. An electric cable having on each side thereof a tension-wire, and wrapped exteriorly, as described, one of said wires being of greater diameter than the others, and the intermediate spaces filled with rope-yarn or other proper fiber, as set forth.

In testimony whereof I affix my signature in presence of two witnesses.

J. BURROWS HYDE.

Witnesses:
  GERARD C. GREEN,
  EDWARD E. ELLIS.